United States Patent [19]
Daoud

[11] Patent Number: 5,913,650
[45] Date of Patent: Jun. 22, 1999

[54] FASTENING DEVICE WITH SECURITY FEATURE

[75] Inventor: Bassel H. Daoud, Parsippany, N.J.

[73] Assignee: Lucent Technologies Inc., Murray Hill, N.J.

[21] Appl. No.: 08/924,026

[22] Filed: Aug. 29, 1997

[51] Int. Cl.[6] ............ F16B 23/00; F16B 35/06; B65D 45/00
[52] U.S. Cl. ............ 411/410; 411/403; 411/910; 411/919; 220/327
[58] Field of Search .................. 411/369, 402, 411/403, 410, 919, 910; 220/327

[56] References Cited

U.S. PATENT DOCUMENTS

| | | | |
|---|---|---|---|
| 2,353,531 | 7/1944 | Whitney | 411/410 |
| 2,590,803 | 3/1952 | Unger et al. | 411/369 |
| 4,242,932 | 1/1981 | Barmore | 411/410 X |
| 5,249,899 | 10/1993 | Wilson | 411/410 X |
| 5,449,260 | 9/1995 | Whittle | 411/410 X |

*Primary Examiner*—Neill Wilson

[57] ABSTRACT

216-type screws and KS-type screws are two types of fastening devices typically used to restrict access to the chambers of building entrance protector (BEP) enclosures used in telecommunications applications. Access to such chambers is limited to those users who have special tools designed for one or the other type of screw. The present invention is a screw that can be actuated using either the special tools designed for 216-type screws or the special tools designed for KS-type screws. In particular, screws of the present invention have a hexagon-shaped outer surface like a 216-type screw and a hexagon shaped recess with a cylindrical upstanding post in the middle of the recess like a KS-type screw.

8 Claims, 3 Drawing Sheets

FASTENING DEVICE WITH SECURITY FEATURE

BACKGROUND OF THE INVENTION

1. Field of the Invention

The present invention relates to fastening devices, and, in particular, to screws and bolts used in telecommunications applications.

2. Description of the Related Art

A building entrance protector (BEP) enclosure houses the physical interface between the nodes of a local telecommunications network and a telecommunications cable. For example, a BEP enclosure may house the interface hardware between the telephones of an office building and an exterior telephone cable having a number of twisted copper pairs that carry the voice signals for those telephones. A BEP enclosure would typically be mounted in the basement or first floor of the office building. A BEP enclosure may also be used to house the interface hardware for systems based on fiber optical communications. Similarly, BEP enclosures may be used with telecommunications systems carrying signals other than just telephone voice signals.

A BEP enclosure provides two main functions: (1) it houses the hardware that provides connections between a cable and the individual nodes (e.g., telephones) of a local network; and (2) it houses the hardware that provides electrical isolation between the cable and the local network. Electrical isolation is intended to prevent any high voltages and/or high currents that may exist from time to time in the cable from reaching the local network. For example, a BEP enclosure will house isolation components designed to protect telephone users from lightning striking a telephone cable. Such electrical isolation is typically provided by 5-pin plug-in protectors that quickly connect signals to ground upon detection of sufficiently high voltages or currents.

Depending on the situation, it may be desirable to control the access that different users have to the different types of hardware housed in a BEP enclosure. For example, when a BEP enclosure is to be used in an office building, it may be desirable to provide operators of the office building with access to the connection hardware housed in the BEP enclosure, but not to the isolation hardware. In this way, the office-building operators would be able to adjust the distribution of telephone signals from the cable to the various offices in the building, while, at the same time, being prevented from disturbing the electrical isolation hardware housed in the BEP enclosure.

To achieve this access control, BEP enclosures typically have two or more chambers that house the different types of hardware. For example, isolation components may be housed in a first chamber, and connection components, in a second chamber. The BEP enclosure can then be configured to provide only limited access to the office-building operators, that is, access to the second chamber but not to the first chamber. Representatives of the telephone service company, on the other hand, would have access to both chambers.

FIGS. 1(a) and 1(b) show perspective and cross-sectional views, respectively, of the three basic parts of a typical BEP enclosure 100: the base 102, the mid layer 104, and the cover 106. The base is essentially a rectilinear box with a bottom, four side walls, and open on its top. The mid layer has four side walls with a mounting plane 108 perpendicular to the four side walls. The mid layer is adapted to be pivotally connected to the base at one side (110), and the cover is adapted to be pivotally connected to the mid layer at the other side (112). The interior of the base and the lower portion of the mid layer form an inner chamber 114 of the BEP enclosure, while the upper portion of the mid layer and the cover form an outer chamber 116 of the BEP enclosure. As such, the mounting plane of the mid layer forms both the top surface of the inner chamber and the bottom surface of the outer chamber.

Chamber access is typically controlled by the type of mechanism used to hold together the parts that form the chamber. For example, special security screws can be used to seal a chamber, thereby restricting access to only those individuals who have special tools designed to remove those security screws. Two such screws are 216-type screws and KS-type screws, each of which requires a different special tool to remove. If a regular slotted or Philips-head screw is used to secure the chamber, then access will not be restricted because regular and Philips-head screw drivers are readily available.

In typical applications, the design specifications for a BEP enclosure will call for the use of one type of security screw or the other, but usually not both. In order for the representatives of telephone service companies to be able to work with BEP enclosures secured with 216-type screws as well as those secured with KS-type screws, they must carry both types of special tools with them at all times.

SUMMARY OF THE INVENTION

The present invention is directed to a fastening device, such as a screw or bolt, that can be actuated using either the special tool designed for KS-type screws or the special tool designed for 216-type screws. As such, a representative of a telephone service company who has either one of those types of special tools will be able to work with a BEP enclosure that is secured using the fastening device of the present invention.

According to one embodiment of the present invention, a fastening device comprises a head and a threaded body, wherein the head has a hexagon-shaped outer surface and a with a cylindrical upstanding post (i.e., pin 312) in the middle of the recess.

BRIEF DESCRIPTION OF THE DRAWINGS

Other aspects, features, and advantages of the present invention will become more fully apparent from the following detailed description, the appended claims, and the accompanying drawings in which:

FIGS. 4(a) and 4(b) show a side view and a top view, respectively, of a screw, according to one embodiment of the present invention.

DETAILED DESCRIPTION

Figure 2A:
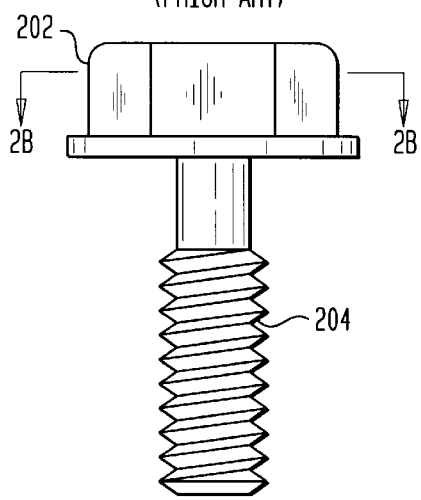
FIGS. 2(a) and 2(b) show a side view and a top view, respectively, of a conventional 216-type screw.
Figure 2B:
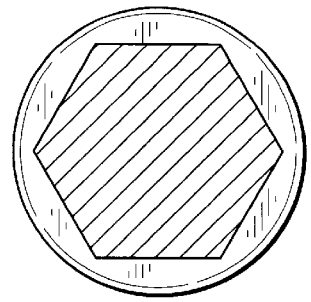

FIGS. 2(a) and 2(b) show a side view and a top view, respectively, of a conventional 216-type screw 200, having a hexagon-shaped head 202 and a threaded body 204. In order for access to certain chambers to be restricted, the screw holes of BEP enclosures are designed to be countersunk with a relatively small clearance between the screw head and the wall of the cylindrical countersink. As such, only those users who have a special type of tool will be able to have access to the chambers of BEP enclosures that are secured using 216-type screws 200 of FIG. 2. One such special tool has a hexagon-shaped opening that is sized to engage the hexagon-shaped head 202 of screw 200, and a cylindrical outer surface with an outer diameter sufficiently small to fit the tool within the small clearance between the screw head and the countersink wall. As such, the end view of such a tool is similar to FIG. 2(b).

Figure 3A:
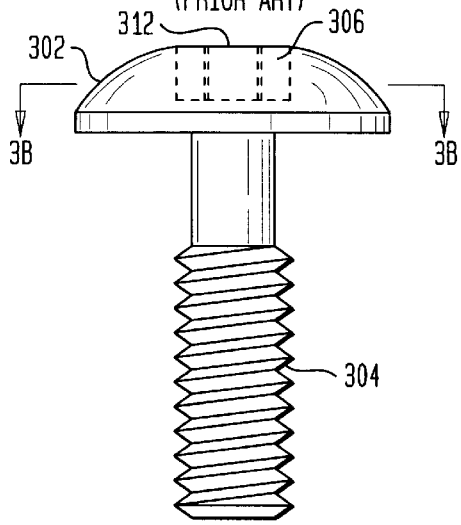
FIGS. 4(a) and 3(b) show a side view and a top view, respectively, of a conventional KS-type screw.
Figure 3B:
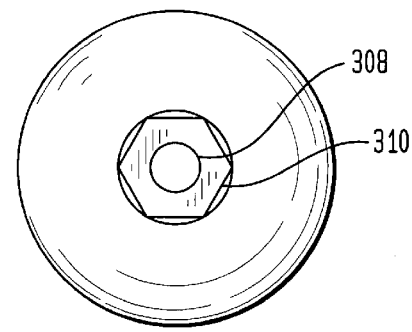

FIGS. 3(a) and 3(b) show a side view and a top view, respectively, of a conventional KS-type screw 300, having a head 302 and a threaded body 304. The head 302 of KS-type screw 300 has hexagon-shape recess 306 with a cylindrical upstanding post (i.e., pin 312) in the middle of the recess. That is, the inner surface of recess 306 is defined by circle 308, and the outer surface of recess 306 is defined by hexagon 310. Circle 308 defines a cylindrical pin 312 within recess 306. As in the case of countersunk screw 200, only those users who have a special type of tool will be able to have access to the chambers of BEP enclosures secured using KS-type screws of FIG. 3. One such special tool has an end that mates with recess 306 of FIG. 3. That is, the tool has a hexagon-shaped outer surface and a cylindrical recess, where the tool receives pin 312 of screw 300 as the tool fits within recess 306.

Figure 4A:
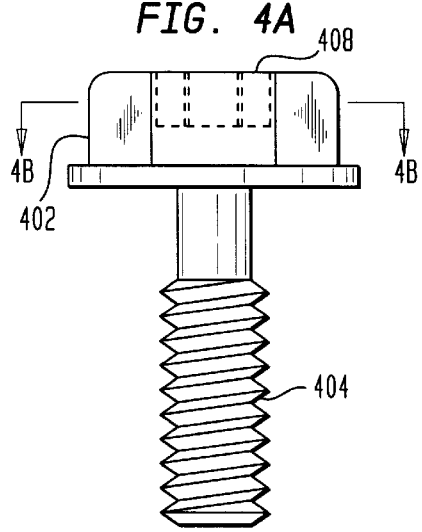
Figure 4B:
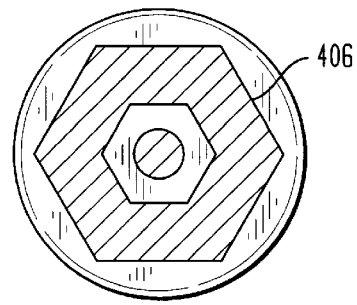

FIGS. 4(a) and 4(b) show a side view and a top view, respectively, of a screw 400, according to one embodiment of the present invention. Screw 400 has a head 402 and a threaded body 404. In particular, head 402 of screw 400 has a hexagon-shaped outer surface 406 like head 202 of screw 200 of FIG. 2. Head 402 also has a recess 408 like recess 306 of screw 300 of FIG. 3. As such, screw 400 can be actuated with any of the special tools designed for either the 216-type screws of FIG. 2 or the KS-type screws of FIG. 3. This means that, no matter which special tool a user happens to have, he or she will be able to gain access to a chamber secured using a screw of the present invention.

The present invention provides additional advantages over the prior art. Screws according to the present invention can be used for those BEP enclosures having design specifications that call for 216-type screws as well as for those BEP enclosures having design specifications that call for KS-type screws. Because only one type of screw needs to be manufactured (i.e., screw 400 of FIG. 4), rather than two different types of screws (i.e., screws 200 of FIG. 2 and screws 300 of FIG. 3), the unit cost of manufacturing the screws is lower, resulting in potentially large overall savings in light of the large numbers of units involved.

The dimensions of screws 200, 300, and 400 shown in FIGS. 2–4, respectively, are intended solely for illustrative purposes; the present invention is by no means limited to fastening devices having only those dimensions.

Figure 1A:
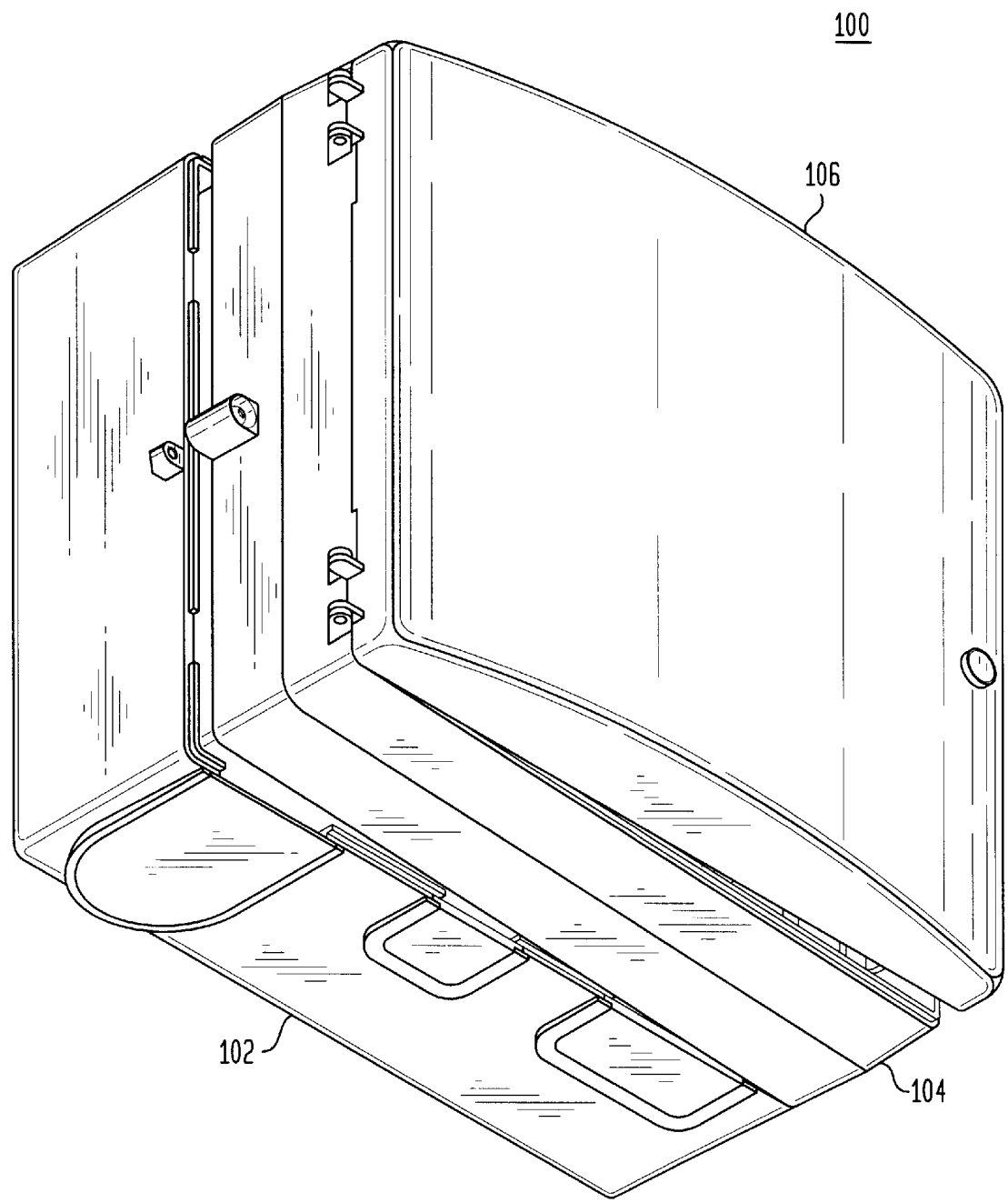
FIGS. 1 (a)(b) show perspective and cross-sectional views of a typical BEP enclosure.
Figure 1B:
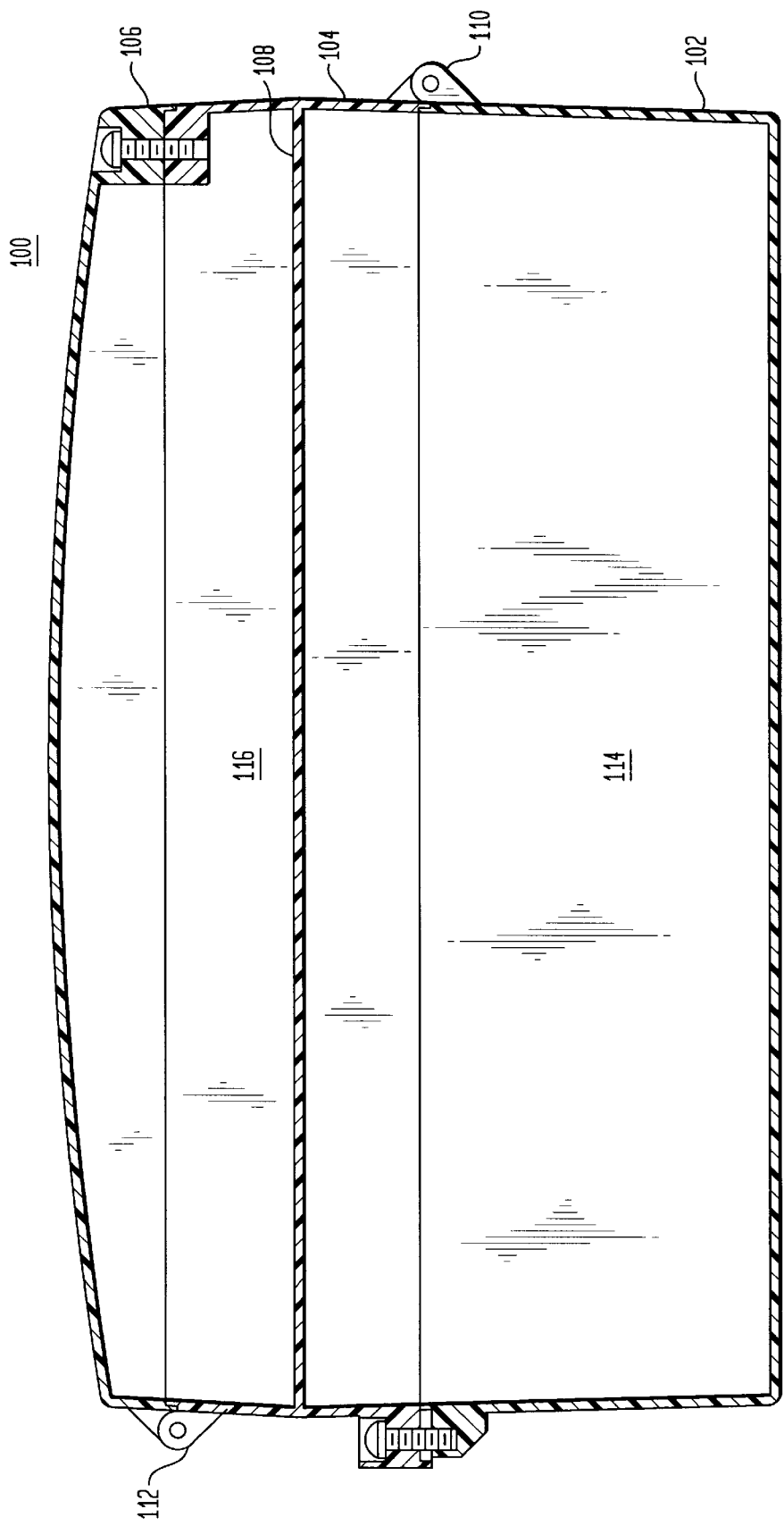

In FIG. 4, the present invention is implemented as a screw used to secure BEP enclosures for telecommunications applications such as BEP enclosures 100 of FIGS. 1A–B. The present invention may also be implemented as other types of fastening devices, including bolts. Moreover, the fastening devices of the present invention may be used for applications other than the securing of BEP enclosures.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A fastening device comprising a head and a threaded body, wherein the head has a hexagon-shaped outer surface and a hexagon-shaped recess with a cylindrical upstanding post in the middle of the recess.

2. The invention of claim 1, wherein the fastening device is adapted to be actuated by either a tool designed for a 216-type screw or a tool designed for a KS-type screw.

3. The invention of claim 1, wherein the outer surface of the head corresponds to the outer surface of a 216-type screw and the recess of the head corresponds to the recess of a KS-type screw.

4. The invention of claim 1, wherein the fastening device is a screw.

5. A BEP assembly comprising a BEP enclosure and one or more fastening devices adapted to secure one or more chambers of the BEP enclosure, wherein at least one of the fastening devices comprises a head and a threaded body, wherein the head has a hexagon-shaped outer surface and a hexagon-shaped recess a with a cylindrical upstanding post in the middle of the recess.

6. The invention of claim 5, wherein the fastening device is adapted to be actuated by either a tool designed for a 216-type screw or a tool designed for a KS-type screw.

7. The invention of claim 5, wherein the outer surface of the head corresponds to the outer surface of a 216-type screw and the recess of the head corresponds to the recess of a KS-type screw.

8. The invention of claim 5, wherein the fastening device is a screw.

\* \* \* \* \*